(No Model.)

M. W. JENKS.
PLAITING MACHINE.

No. 270,568. Patented Jan. 9, 1883.

Witnesses.
R. H. Brown
Lewis Schmunder

Inventor.
M. Woodburn Jenks

UNITED STATES PATENT OFFICE.

M. WOODBURN JENKS, OF DECATUR, ILLINOIS.

PLAITING-MACHINE.

SPECIFICATION forming part of Letters Patent No. 270,568, dated January 9, 1883.

Application filed October 31, 1882. (No model.)

*To all whom it may concern:*

Be it known that I, M. WOODBURN JENKS, a citizen of the United States, residing at Decatur, county of Macon, and State of Illinois, have invented a new and useful Plaiting-Machine, of which the following is a specification.

My invention relates to improvements in the modes of plaiting dress-goods, carriage-trimmings, and upholsterers' work by using an adjustable manipulating-knife and metal springs or tapes to hold the work in position.

The object of my invention is to provide a machine to do a greater variety of work, faster, better, and cheaper than any of the inventions now in use. I attain these objects by the mechanism illustrated in the accompanying drawings, in which—

Figure 1:
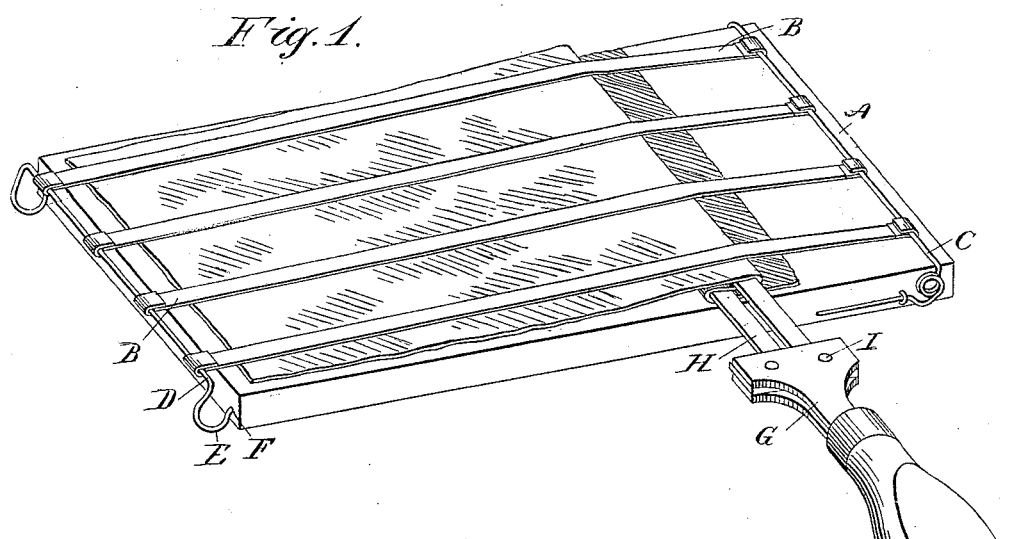
Figure 2:
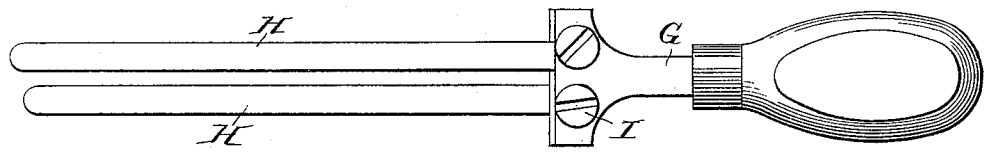
Figure 3:

Figure 1 is a perspective view of the whole device. Fig. 2 is a front view of the knife, and Fig. 3 is an edge view of the knife for plaiting.

The board A for dress-plaiting is eighteen inches long and ten inches wide; for carriage-trimmings or upholstering work it can be made any desired length or width. One end of the springs or tapes B B B B are hooked on self-adjusting spring-bar C. Spring-bar C is a straight bar extending across the top of right-hand end of board A, with spiral springs of two coils at each end, and are fastened in sides of board A in such position that the tension of the springs presses the bar firmly to the upper surface of board A. The tension of the spiral coils is such as to admit the raising of bar C to permit the plaited goods to pass under. The object of the pressing of the bar C to the board A is to hold the goods firmly while being plaited. The other ends of springs or tapes are hooked to spring-bar D. Spring-bar D is a straight bar extending across left-hand end of board A, with springs E E at each end. The ends of springs E E are inserted into holes F F in end of board A.

The adjustable plaiting-knife G is made with two steel blades, H H, one-half inch wide, one-sixteenth inch thick, and twelve inches (or more) long, as may be required. The handle is a T-shaped clamp extending one inch each way from the center at right angles. The blades H H are held in the clamp by set-screws I I. The knife G is one-half inch wide when closed, but when extended to the end of the T is two inches wide.

Place the goods to be plaited under the tapes B B B B lengthwise; gage the adjustable knife to the size the goods are to be plaited; insert the knife under the springs or tapes, with one blade under and the other blade over the goods to be plaited; turn the knife either way to form plaits. The springs or tapes B B B B are adjustable at each end, and slide over the wires that support them, so they can be massed or spread apart.

I am aware that there is an invention patented that claims a flexible apron for holding the goods in position, and a plaiting-knife with parallel blades of unequal length. My invention is a different device entirely, as the spring-bars, in combination with the tapes, are self-adjusting, and the knife is adjustable.

Having thus described my invention, what I claim, and desire to secure by Letters Patent in the plaiting-machine, is—

1. The spring-bar D, in combination with the flat springs or tapes B B B B.

2. The spring-bar C, in combination with flat springs or tapes B B B B.

3. The adjustable plaiting-knife G, having two blades, which are held in a T-shaped handle by set-screws, permitting the blades to be extended from one-half inch to two inches, in combination, as above specified and set forth.

M. WOODBURN JENKS.

Witnesses:
LEWIS SCHOONMAKER,
F. W. ANDERSON.